United States Patent [19]

Tsuchiya

[11] Patent Number: 4,705,132
[45] Date of Patent: Nov. 10, 1987

[54] POWER STEERING GEAR

[75] Inventor: Masuo Tsuchiya, Fujisawa, Japan

[73] Assignee: Nissan Motor Company, Limited, Kanagawa, Japan

[21] Appl. No.: 787,097

[22] Filed: Oct. 15, 1985

[30] Foreign Application Priority Data

Nov. 12, 1984 [JP] Japan .......................... 59-171150[U]

[51] Int. Cl.$^4$ .............................................. B62D 5/08
[52] U.S. Cl. ..................................... 180/148; 60/468; 91/375 A; 180/141
[58] Field of Search ............... 180/132, 141, 143, 148; 60/468; 91/396, 448, 451, 375 A

[56] References Cited

U.S. PATENT DOCUMENTS 4,085,817  4/1978  Kervagoret ........................ 180/132
4,365,683  12/1982  Adams ............................... 180/132
4,565,115  1/1986  Bacardit ............................ 180/132

FOREIGN PATENT DOCUMENTS 58-178061  11/1983  Japan .

Primary Examiner—John J. Love
Assistant Examiner—Donn McGiehan
Attorney, Agent, or Firm—Schwartz, Jeffery, Schwaab, Mack, Blumenthal & Evans

[57] ABSTRACT

A power steering gear has a variable restriction structure disposed along an oil passage between a control valve housed in a steering gear box and a power cylinder engaging a steering rack. The variable restriction increases the flow cross-section through the restricted oil passage between the control valve and the power cylinder as the hydraulic pressure in the control valve increases so as to reduce the required steering force when relatively hard steering is called for.

2 Claims, 5 Drawing Figures

POWER STEERING GEAR

BACKGROUND OF THE INVENTION

1. Field of the Invention

The present invention relates generally to a power steering gear and more particularly to a power steering gear used for reducing steering force without changing the steering gear ratio.

2. Description of the Prior Art

A conventional power steering gear is exemplified by Japanese Utility Model Application Unexamined Open No. Sho. 58-178,061, published Nov. 29, 1983. FIGS. 1 and 2 show the conventional power steering gear disclosed in the above-identified document. The conventional power steering gear comprises: a pipe 14 communicating between a gear housing 6, in which a control valve 10 is incorporated, and a power cylinder 12; and a drive seat 16 interposed between a suction/exhaust port 12a of the power cylinder 12 and the pipe 14. If the diameter of the bore 16a of the drive seat 16 is restricted, a kickback input due to reaction against the road surface is attenuated and vibrations such as steering shimmy, which arises in a specific vehicle speed range, are prevented. In this way, the drive seat functions as an oil damper and prevents noise due to vibrations such as described above. However, since the diameter of the bore 16a of the drive seat 16 is constant in the conventional power steering gear, the line resistance due to the restricted bore 16a of the drive seat 16 is high enough that the steering becomes heavy when high hydraulic pressure is generated in the control valve 10 during abrupt and large steering operations. Consequently, the normal advantages of power steering are not provided during abrupt and large steering operations.

SUMMARY OF THE INVENTION

With the above-described problem in mind, it is an object of the present invention to provide a power steering gear in which a variable restriction is provided between the control valve 10 and power cylinder 12 so that the flow cross-section through the oil passage between the control valve 10 and power cylinder 12 is locally restricted to attenuate the kickback input and to prevent vibrations such as steering shimmy, etc., and noise due to such vibrations when a relatively low hydraulic pressure is generated in the control valve 10 and the flow cross-section through the restricted oil passage between the control valve 10 and power cylinder 12 is locally widened to reduce the line resistance when a high hydraulic pressure is generated in the control valve 10, e.g., during abrupt and large steering operations, thus preventing unnecessarily heavy steering.

The above-described object can be achieved by providing a power steering gear comprising a power cylinder, a control valve, and a variable restriction structure disposed in an oil passage between the power cylinder and the control valve which increases the flow cross-section through the restricted oil passage between the control valve and the power cylinder as the hydraulic pressure in the control valve increases.

BRIEF DESCRIPTION OF THE DRAWINGS

A more complete understanding of the present invention may be obtained from the description below taken in conjunction with the attached drawings in which like reference numerals designate corresponding elements and in which.

DETAILED DESCRIPTION OF THE PREFERRED EMBODIMENT

Reference will hereinafter be made to the attached drawings in order to facilitate understanding of the present invention.

Figure 1:
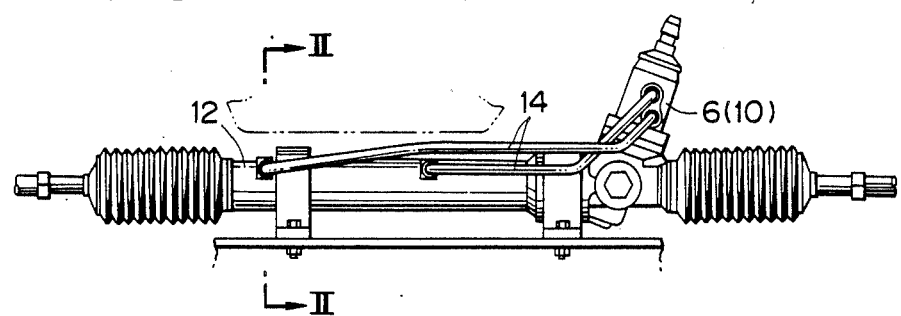
FIG. 1 shows the conventional power steering gear disclosed in Japanese Utility Model Application Unexamined Open No. Sho. 58-178,061.
Figure 2:
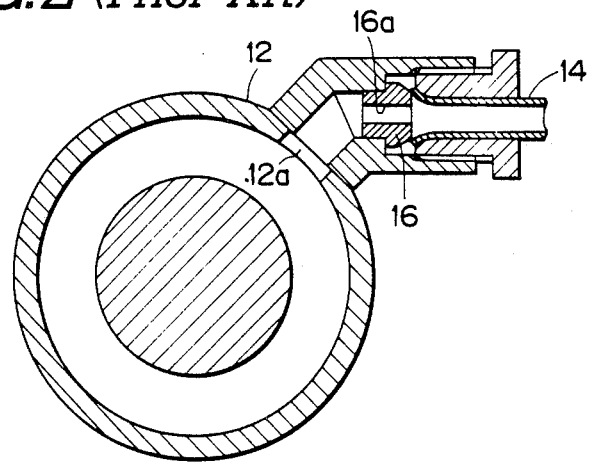
FIG. 2 is an enlarged cross-section through a drive seat taken along the line II—II of FIG. 1.
Figure 3:
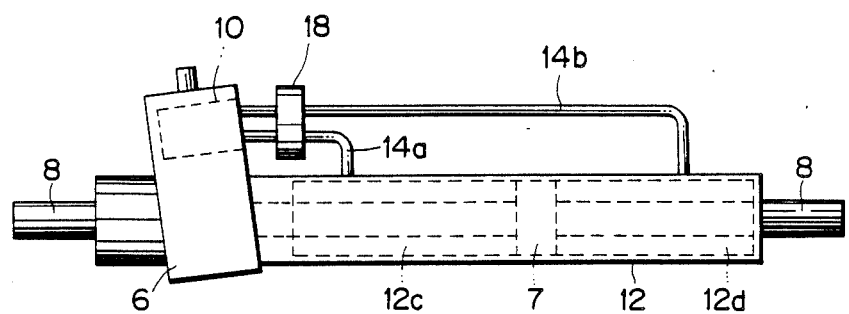
FIG. 3 shows the preferred embodiment of a power steering gear according to the present invention.
Figure 4:
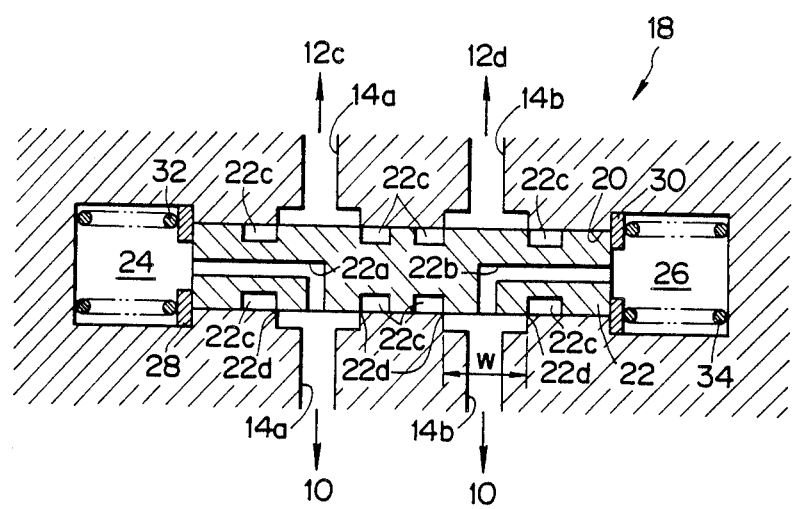
FIG. 4 is a detailed, enlarged cross-section through the variable restriction portion shown in FIG. 3.
Figure 5:
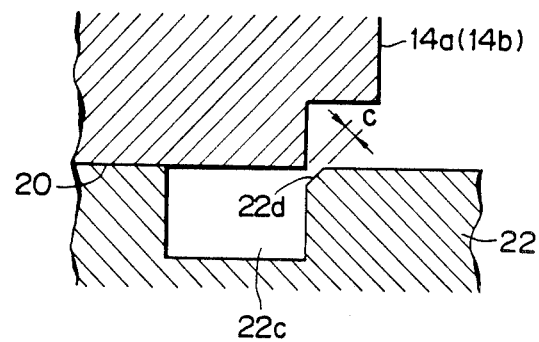
FIG. 5 is a partially enlarged view of a chamfer shown in FIG. 4.

FIGS. 3 through 5 show a preferred embodiment of the power steering gear. In FIG. 3, a steering gear box denoted by numeral 6 houses a conventional control valve 10. A steering pinion in the gear box 6 is actuated by means of a steering wheel (not shown) located above the elements shown in FIG. 3 to actuate the control valve 10. In addition, a rack 8 linked at either end to left and right steered wheels extends coaxially within the power cylinder 12 and meshes with the steering pinion. A piston 7 partitioning the power cylinder 12 into a pair of oil chambers 12c, 12d is fixed to the rack 8. The control valve 10 has a pair of oil supply/return ports communicating with the oil chambers 12c, 12d of the power cylinder 12 via two pipes (oil passages) 14a, 14b. The supply/return ports serves as oil return ports or oil supply ports alternatingly depending on the steering direction of the steering wheel.

A variable restriction structure 18 comprising a spool valve shown in FIG. 4 is disposed midway along the pipes 14a, 14b between the control valve 10 and power cylinder 12. In FIG. 4, a spool bore 20 crosses essentially perpendicular to the pipes 14a, 14b and houses a spool 22 which is free to reciprocate axially. A pair of pressure chambers 24, 26 are formed opposite the axial ends of the spool 22. Two reaction springs (elastic means) 32, 34, one housed within each of the pressure chambers 24, 26, apply elastic force in opposite directions against the end faces of the spool 22 via corresponding retainers 28, 30 so as to bias the spool 22 toward a rest position centered axially within the spool bore 20.

The pressure chambers 24, 26 communicate with the supply/return ports of the control valve 10 via communicating passages 22a, 22b through the spool 22. In addition, a set of four annular grooves 22c around the spool 22 are disposed so as to bracket the widened ports of the pipes 14a, 14b when the spool 22 is in its rest position. When the spool 22 is in its rest position, the ports in the pipes 14a, 14b communicate with the annular grooves 22c via narrow clearances C afforded by chamfered edges 22d at the shoulders of the annular grooves 22c as shown in the enlargement in FIG. 5. In this case, the flow cross-section through the restricted oil passage is quite small. Thus, when the spool 22 moves axially, the ports of the pipes 14a, 14b will overlap two of the annular grooves 22c so that they will then communicate with each other via a wider passage. In other words, the flow cross-section through the restricted oil passage (pipes) is accordingly enlarged.

Next, the action of the preferred embodiment will be described.

When the hydraulic pressure within the control valve 10 is relatively low, e.g., as the vehicle moves straight ahead, the spool 22 assumes its neutral rest position just as shown in FIG. 4 since the position of the spool 22 is controlled by the mutual elastic forces of the reaction springs 32, 34 on opposite sides of the spool 22. In this case, the oil passage between the control valve 10 and power cylinder 12 is restricted by the narrow clearances C shown in FIG. 5. This narrow restriction of the oil passage attenuates kickback input and vibrations such as steering shimmy so that noise caused by such vibrations can be prevented.

On the other hand, when the hydraulic pressure in the control valve 10 is relatively high during abrupt steering movement, pressurized hydraulic fluid is introduced into, e.g., the left pressure chamber 24 which is in constant communication with the hydraulic pressure supply port via the pipe 14a and passage 22a. The hydraulic pressure in the pressure chamber 24 acts on the left end of the spool 22 as viewed in FIG. 4 so that the spool 22 moves to the right against the force of the other reaction spring 34. At this time, the ports of the pipes 14a, 14b, with mouth widths W, overlap the corresponding annular grooves 22c of the spool 22 so that the flow cross-section through the restricted oil passage between the control valve 10 and power cylinder 12 becomes wider than the clearances C afforded by the chamfers described above. Consequently, the line pressure resistance becomes lower than in the case in which the oil passage is restricted to the clearances C.

Therefore, the high hydraulic pressure generated in the control valve 10 is quickly introduced into the oil chamber 12c of the power cylinder 12 and the oil in the other oil chamber 12i d is quickly returned to the control valve 10. Consequently, the steering force felt by the operator is relieved so that unnecessarily heavy steering is avoided. This is particularly effective when abrupt steering operations are carried out.

As described above, since the power steering gear according to the present invention is provided with the variable restriction structure between the control valve and power cylinder, the flow cross-section through the oil passage between the control valve and power cylinder is locally restricted so that the kickback input and vibrations due to the steering shimmy can be attenuated and noise due to such vibrations can be prevented, when the hydraulic pressure in the control valve 10 is relatively low. In addition, when the hydraulic pressure in the control valve 10 is relatively high due to abrupt steering, the flow cross-section through the oil passage between the control valve and power cylinder is widened to reduce the line pressure resistance so that unnecessarily heavy steering is prevented. Consequently, the merits of the power steering gear can fully be exhibited.

It will be fully be understood by those skilled in the art that although the foregoing description has been in terms of the preferred embodiment, various changes and modifications may be made without departing from the scope of the present invention which is to be defined by the appended claims.

What is claimed is:

1. A power steering gear arrangement for a vehicle having a power cylinder operatively coupled to a steering rack, and a control valve linked to a steering wheel, comprising:

(a) oil passage means positioned between and communicating with said control valve and said power cylinder, (b) means located in said oil passage means for variably restricting the flow of oil between said control valve and said power cylinder, said restricting means including restriction orifice means permitting a continuous, limited amount of flow of oil to said power cylinder when power steering assist is not necessary, for attenuating kickback input and vibration, and substantially and quickly increasing such oil flow when hydraulic pressure in the control valve increase in response to the need for power steering assist, and wherein (c) said variable restricting means comprises a spool valve including an axially movable spool, the longitudinal positioning of which controls the flow of oil through said oil passage means from said control valve to said power cylinder, pressure chambers located at each end of said spool, said control valve having supply and return ports communicating with said pressure chambers, means for biasing each end of said spool to a rest position in which the flow of oil to said power cylinder is minimized, whereby increased oil pressure in said control valve due to steering function results in increased flow to one of said pressure chambers, thereby increasing the pressure in such chamber relative to the other of said chambers, said spool being moved longitudinally as a result of such pressure differential to increase the flow crosssection through said passage means and consequently the flow to said power cylinder to assist the steering movement.

2. The power steering gear arrangement of claim 1, wherein said restriction orifice means comprises annular grooves formed in the periphery of said spool, said grooves being formed with chamfered surfaces at the peripheral edges of said grooves adjacent said passage means, the flow of oil from said control valve through said variable restricting means when said spool is in a rest position being confined to the space partially defined by said chamfered surfaces, movement of said spool functioning to partially or entirely align said grooves with said oil passage means to permit increased flow from said control valve to said power cylinder.

* * * * *